United States Patent
Iga

(10) Patent No.: US 7,990,455 B2
(45) Date of Patent: Aug. 2, 2011

(54) IMAGE INFORMATION MANAGEMENT SYSTEM

(75) Inventor: Masahito Iga, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 2087 days.

(21) Appl. No.: 10/620,598

(22) Filed: Jul. 17, 2003

(65) Prior Publication Data

US 2004/0064479 A1    Apr. 1, 2004

(30) Foreign Application Priority Data

Sep. 27, 2002 (JP) .................................. 2002-283431

(51) Int. Cl.
*H04N 5/222* (2006.01)

(52) U.S. Cl. ............. 348/333.02; 348/207.1; 348/231.3; 348/231.99

(58) Field of Classification Search ............... 348/231.3, 348/231.5, 239, 207.1, 231.6, 231.2, 231.9, 348/231.99, 333.01, 333.02, 333.05, 333.12
See application file for complete search history.

(56) References Cited

U.S. PATENT DOCUMENTS

| | | | | |
|---|---|---|---|---|
| 5,712,679 A * | 1/1998 | Coles | ............................. | 348/158 |
| 6,282,362 B1 * | 8/2001 | Murphy et al. | ................. | 386/46 |
| 6,437,797 B1 * | 8/2002 | Ota | ............................... | 345/638 |
| 6,657,661 B1 * | 12/2003 | Cazier | .......................... | 348/231.2 |
| 6,888,565 B1 * | 5/2005 | Tanaka et al. | ............ | 348/207.11 |
| 6,914,626 B2 * | 7/2005 | Squibbs | ...................... | 348/231.3 |
| 7,453,491 B2 * | 11/2008 | Kinjo | ............................. | 348/118 |
| 2001/0015759 A1 * | 8/2001 | Squibbs | ........................ | 348/232 |
| 2003/0053608 A1 | 3/2003 | Ohmae et al. | | |
| 2004/0218894 A1 * | 11/2004 | Harville et al. | ................. | 386/46 |

FOREIGN PATENT DOCUMENTS

| | | |
|---|---|---|
| JP | 7-36916 | 2/1995 |
| JP | 11-66089 | 3/1999 |
| JP | 2001-215941 | 8/2001 |
| JP | 2002-101369 | 4/2002 |
| JP | 2002-185954 | 6/2002 |

OTHER PUBLICATIONS

Japanese Office Action dated Apr. 1, 2008, with English Language Translation, Japanese application: 2002-283431.
Japanese Office Action dated Jun. 17, 2008 with English-Language Translation, Japanese application: 2002-283431.

* cited by examiner

*Primary Examiner* — Lin Ye
*Assistant Examiner* — Chriss S Yoder, III
(74) *Attorney, Agent, or Firm* — McGinn IP Law Group PLLC

(57) ABSTRACT

It is an object of the present invention to provide a display device with which a photographing state of image data can be intuitively known. When a subject is photographed, a quadrangular flag mark representing a photographing point of an image, and a triangular mark and a circular mark of solid lines representing a photographing range, are displayed on a map. A user can download a desired image associated with the marks by clicking the marks. When a subject is not photographed, a triangular flag mark representing the photographing point of the image, and triangular marks and circular marks of broken lines, are displayed on the map. The user can upload necessary images on the basis of the marks.

11 Claims, 14 Drawing Sheets

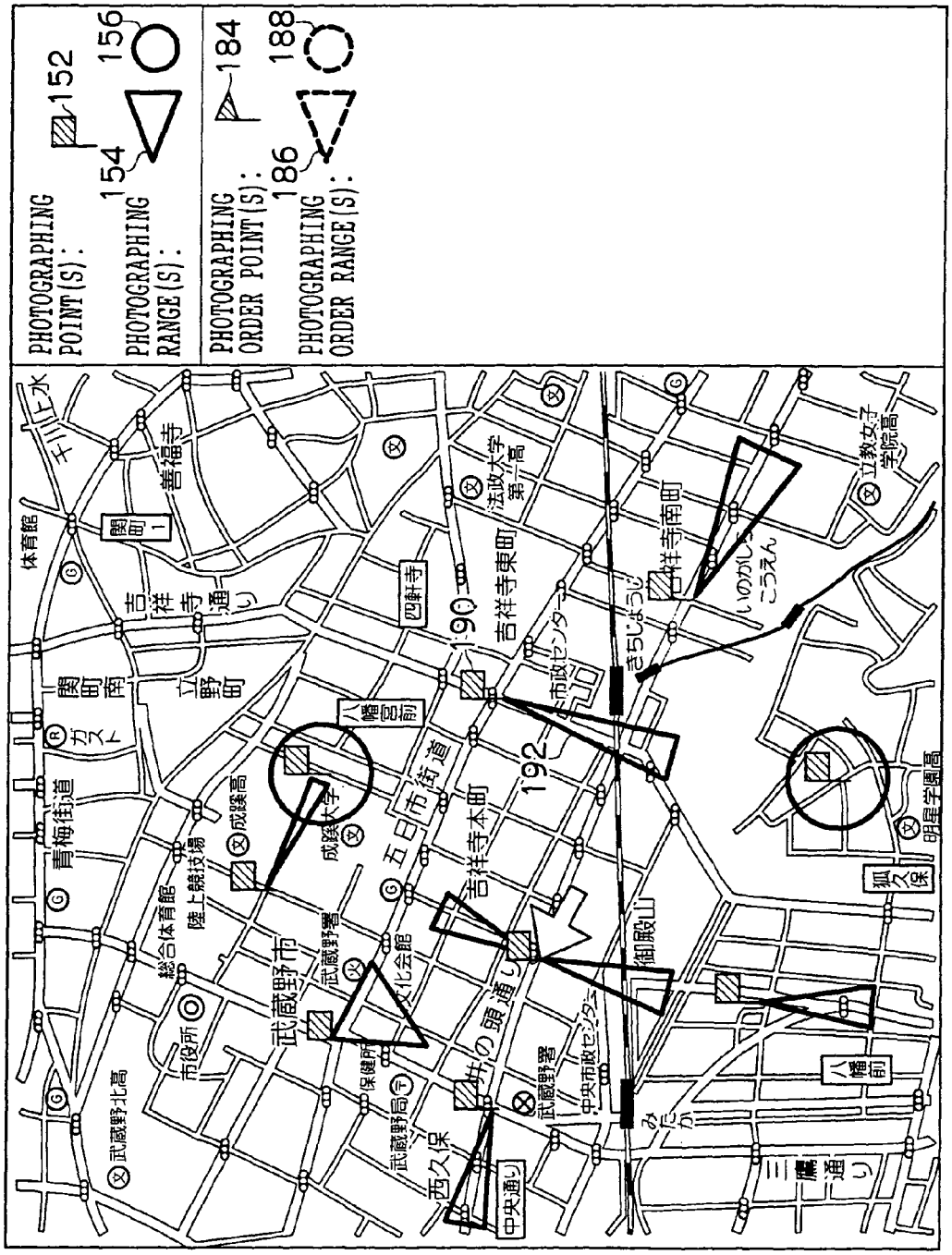

IMAGE INFORMATION MANAGEMENT SYSTEM

CROSS-REFERENCE TO RELATED APPLICATION

This application claims priority under 35USC 119 from Japanese Patent Application No. 2002-283431, the disclosure of which is incorporated by reference herein.

BACKGROUND OF THE INVENTION

1. Field of the Invention

The present invention relates to a display device that displays images, an image information management device that manages image information, an image information management terminal that operates the managed image information, an image information management system including the image information management device and the image information management terminal, an image searching method for searching images, a database construction method for constructing an image database, and a photographing device that photographs images. In particular, the present invention relates to a display device with which photographing states of images can easily be known, an image information management device, an image information management terminal, an image information management system, an image searching method, a database construction method, and a photographing device.

2. Description of the Related Art

Many images have come to be accumulated in accompaniment with the spread of digital photographing devices and an increase in the capacity of storage devices. In order to effectively use the accumulated images, it is preferable to be able to easily know the photographing states of the images without directly viewing each image.

For this reason, in conventional image management, a character string such as, for example, a keyword, a photographing place, or a comment, is added to the images as information representing the photographing states of the images and managed. Thus, an image can be effectively used by searching a desired image by designating the character string as a search condition (e.g., see Japanese Patent Application Laid-Open Publication (JP-A) No. 11-66089).

However, in this case, the information representing the photographing state is characters, and it is difficult for a user to imagine the photographing state of the image from the characters. For this reason, in conventional image searching, the photographing state of the image is verified by viewing plural representative images and an image serving as a key is selected, whereby an optimum keyword is automatically generated in order to search for an image (e.g., see JP-A No. 7-36916).

However, in this case, the photographing state of the desired image must be imagined from the photographing state of another image, and it is not always the case that the image of the desired photographing state can be obtained from the obtained keyword.

SUMMARY OF THE INVENTION

The present invention was devised in view of the above-described facts, and it is an object thereof to enable the photographing state of an image to be intuitively known.

In order to achieve the above object, a display device of a first aspect includes: a display component; and a control component for controlling the display component so that a map including a photographing point of a subject is displayed, and so that information representing a photographing direction from the photographing point to the subject is displayed at a position on the map corresponding to the photographing point.

That is, the control component of the display device controls the display component so that a map including the photographing point of the subject is displayed, and so that information representing the photographing direction from the photographing point to the subject is displayed at a position on the map corresponding to the photographing point. Thus, by viewing the displayed information, a user can intuitively know the photographing state of the image represented by the information.

In the display device of the first aspect, the control component varies a display mode of the information representing the photographing direction between a case where the subject is photographed and a case where the subject is not photographed.

By varying the display mode of the information representing the photographing direction between a case where the subject is photographed and a case where the subject is not photographed, the user can intuitively know whether or not desired image data is present. In a case where it is determined that image data is photographed on the basis of the display mode of the information, image data can be received according to the information. In a case where it is determined that image data is not photographed, image data can be transmitted according to the information.

An image information management device of a second aspect includes a transmitting component for transmitting a map including a photographing point of a subject and information representing a photographing direction from the photographing point to the subject.

That is, the transmitting component of the image information management device transmits a map including a photographing point of a subject and information representing the photographing direction from the photographing point to the subject. Thus, the map including the photographing point of the subject and the information representing the photographing direction from the photographing point to the subject is transmitted, to thereby allow the user to view the same. Thus, the user can intuitively know the photographing state of the image data.

In the image information management device of the second aspect, the transmitting component may be configured so as to be able to transmit the image data, the image information management device may further include a receiving component for receiving a request to transmit image data of the subject, and the transmitting component may transmit the image data when the transmission request is received by the receiving component.

That is, the receiving component can receive the request to transmit image data of the subject, and the transmitting component can transmit the image data requested by the transmission request. Thus, the image information management device can transmit image data that a user desires.

The image information management device of the second aspect may further include: a receiving component for receiving image data obtained by photographing the subject and data of the photographing point of the subject; and an associating component for associating the image data received by the receiving component with the photographing point on the map on the basis of the data of the photographing point received by the receiving component.

That is, the receiving component can receive image data obtained by photographing the subject and data of the photographing point of the subject, and the associating component can associate the received image data with the photographing point on the map. Thus, the user can intuitively know the photographing state of the received image data.

The image information management device of the second aspect may further include: a receiving component for receiving the information representing the photographing direction from the photographing point to the subject; and an associating component for associating the map with the information when the information representing the photographing direction from the photographing point to the subject has been received by the receiving component.

That is, the receiving component can receive the information representing the photographing direction from the photographing point to the subject, and the associating component can associate the map and the information. Thus, because the map and the information can be associated by the information being transmitted without the user having to transmit the data of the photographing point of the subject, user time can be reduced.

An image information management terminal of a third aspect includes: a display component; a receiving component for receiving a map including a photographing point of a subject and information representing a photographing direction from the photographing point to the subject; and a control component for controlling the display component so that the map is displayed, and so that the information representing the photographing direction is displayed at a position on the map corresponding to the photographing point, on the basis of the map and the information representing the photographing direction received by the receiving component.

That is, the receiving component of the image information management terminal receives the map including the photographing point of the subject and information representing the photographing direction from the photographing point to the subject, and the control component controls the display component so that the map is displayed, and so that the information representing the photographing direction is displayed at a position on the map corresponding to the photographing point, on the basis of the map and the information representing the photographing direction received by the receiving component. A user can intuitively know the photographing state of the image data by viewing the map and the information.

In the image information management terminal of the third aspect, the receiving component may be configured so as to be able to receive the image data, the image information management terminal may further include a transmitting component for transmitting a request to transmit image data of the subject, the receiving component may receive the image data transmitted in accordance with the transmission request by the transmitting component, and the control component may control the display component so that an image of the image data received by the receiving component is displayed.

That is, the transmitting component can transmit the request to transmit image data of the subject, the receiving component can receive the image data transmitted in accordance with the transmission request by the transmitting component, and the control component can control the display component so that an image of the image data received by the receiving component is displayed. Thus, a user can receive desired image data.

The image information management terminal of the third aspect may further include a transmitting component for transmitting image data obtained by photographing the subject and data of the photographing point of the subject.

That is, the transmitting component can transmit image data obtained by photographing the subject and data of the photographing point of the subject. Thus, a user can transmit image data.

The image information management terminal of the third aspect may further be disposed with a transmitting component for transmitting information representing a direction from the photographing point to the subject.

That is, the transmitting component can transmit information representing a direction from the photographing point to the subject. Thus, user time can be reduced without the user having to transmit data representing the direction from the photographing point to the subject.

The image information management terminal of the third aspect may further include a designating component for designating, on the map displayed by the display component, information representing the photographing direction from the photographing point to the subject, and the transmitting component may transmit the information representing the photographing direction from the photographing point to the subject when the information is designated by the designating component.

That is, the designating component can designates, on the map displayed by the display component, information representing the photographing direction from the photographing point to the subject, and the transmitting component can transmit the information representing the photographing direction from the photographing point to the subject when the information is designated by the designating component. Thus, the user can transmit information simply by designating the information displayed by the display component, and user time can be reduced.

An image information management system of a fourth aspect includes the image information management device of the second aspect and the image information management terminal of the third aspect.

That is, the transmitting component of the image information management device transmits a map including a photographing point of a subject and information representing a photographing direction from the photographing point to the subject. The receiving component of the image information management terminal receives the map including the photographing point of the subject and the information representing the photographing direction from the photographing point to the subject, and the control component controls the display component so that the map is displayed, and so that the information representing the photographing direction is displayed at a position on the map corresponding to the photographing point, on the basis of the map and the information representing the photographing direction received by the receiving component. A user can intuitively know the photographing state of the image data by viewing the map and the information.

An image searching method of a fifth aspect includes the steps of: corresponding and storing image data obtained by photographing a subject and a photographing point of the subject; displaying a map including the photographing point of the subject, and displaying, at position on the map corresponding to the photographing point, information representing a photographing direction from the photographing point to the subject; selecting, on the map, the information representing the photographing direction from the photographing point to the subject; and searching, on the basis of the selected information, the image data corresponding to the photographing point.

Thus, a user can intuitively know the photographing state of image data by viewing the map and the information, whereby the user can effectively search image data.

A database construction method of a sixth aspect includes the steps of: displaying a map in which information representing a photographing direction from a photographing point to a subject is displayed at a position thereon corresponding to the photographing point; receiving image data corresponding to the information representing the photographing direction from the photographing point to the subject; and associating and storing the image data and the information representing the photographing direction from the photographing point to the subject.

That is, a user can display a map, in which information representing the photographing direction from the photographing point of necessary image data to the subject is displayed at a position thereon corresponding to the photographing point, whereby another user can know image data corresponding to the necessary information and can transmit, on the basis of this, image data. Thus, construction of a database with which the photographing state of image data can easily be known is facilitated, and image data of the database can be easily increased.

A photographing device of a seventh aspect includes: a photographing component for photographing a subject and generating image data; detection component for detecting photographing point data of a point at which the subject is photographed by the photographing component and directional data representing, by direction, a direction facing the subject from the photographing point; and a storage component for corresponding and storing the image data generated by the photographing component and the directional data and geographical data detected by the detection component.

That is, the photographing component of the photographing device of the present invention photographs the subject and generates image data, the detection component detect photographing point data of the point at which the subject is photographed by the photographing component and directional data representing, by direction, a direction facing the subject from the photographing point, and the storage component corresponds and stores the image data generated by the photographing component and the directional data and geographical data detected by the detection component. Thus, a user can easily obtain, together with the image data, the directional data and geographical data of the photographing point corresponding to the image data, and time for transmitting the geographical data and the directional data separately from the image data when the image data is transmitted can be reduced.

As described above, with the image display device of the present invention, the effect is obtained that a user can intuitively know the photographing state of image data, because a map including the photographing point of the subject is displayed, and information representing the photographing direction from the photographing point to the subject is displayed at a position on the map corresponding to the photographing point.

BRIEF DESCRIPTION OF THE DRAWINGS

FIG. 14 shows a map in the embodiment of the present invention.

DETAILED DESCRIPTION OF THE INVENTION

An embodiment of the present invention will be described below with reference to the drawings.

Figure 1:
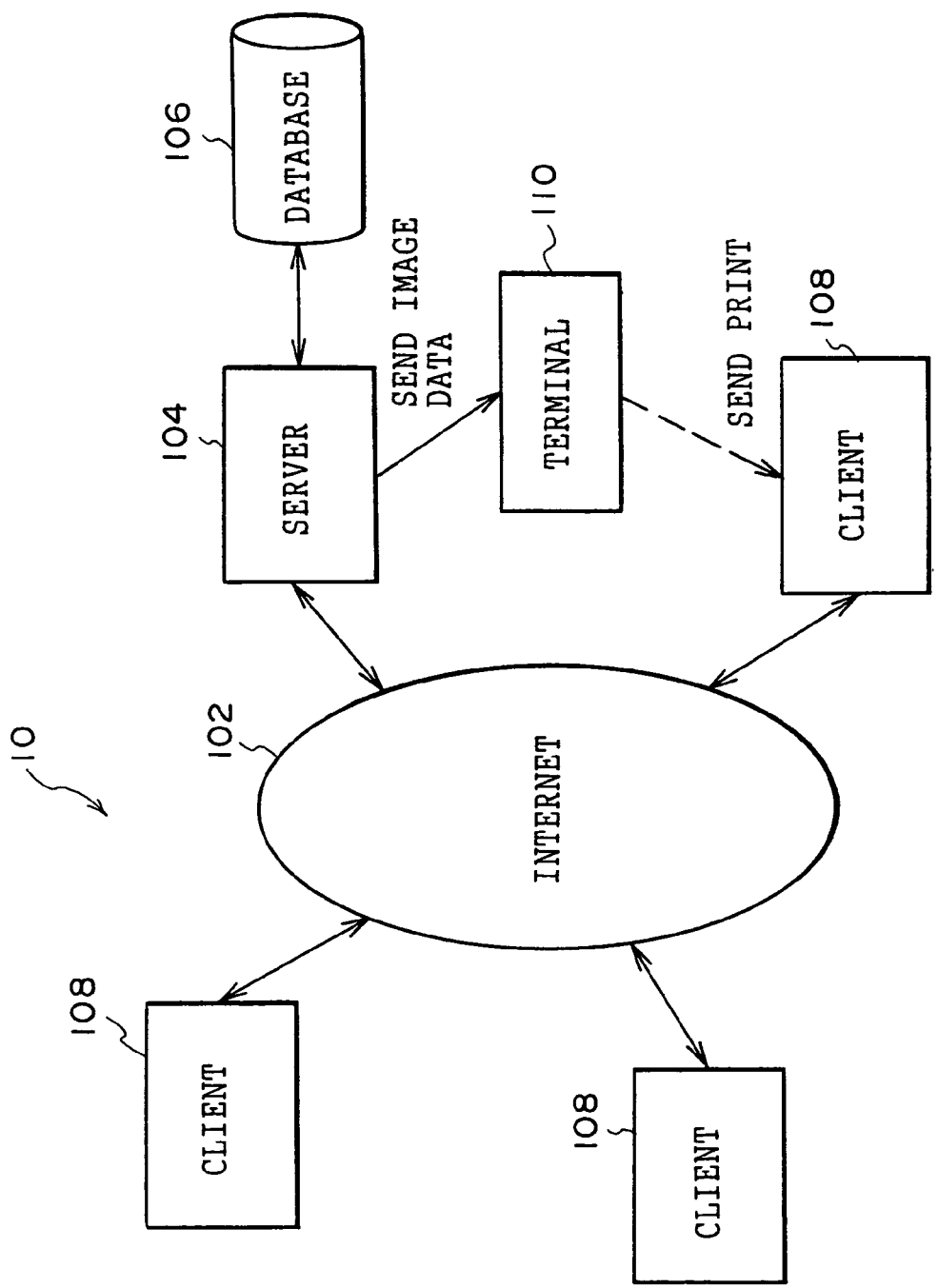
FIG. 1 is a diagram of the overall configuration of an image information management system in the embodiment of the present invention.

FIG. 1 shows an image information management system 10 pertaining to the embodiment of the present invention. The image information management system 10 is configured by connecting clients 108, such as plural personal computers or a terminal in a shop, a server 104, which is connected to a database 106 that stores images and the like, via a network 102 such as the Internet. The server 104 may be connected to a terminal 110 for business that conducts contents processing, photo-lab services, or the like. The server 104 configures an image information management device or a display device, and the clients 108 configure image information management terminals or display devices.

Figure 2:
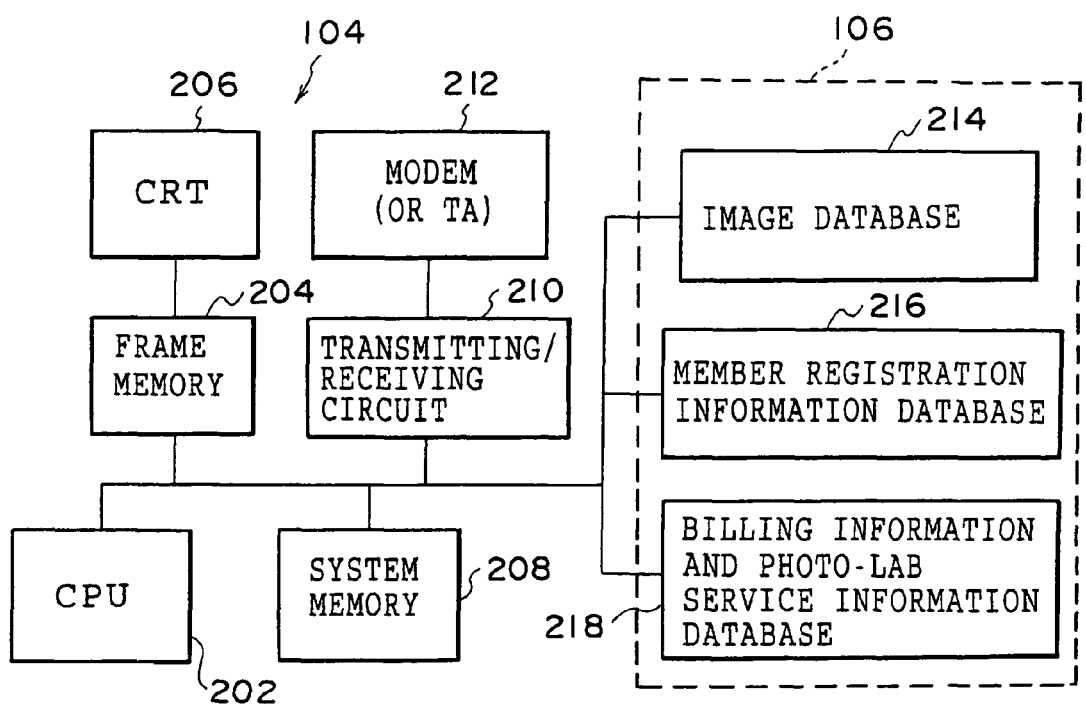
FIG. 2 shows a server and a database in the embodiment of the present invention.

FIG. 2 is a block diagram showing internal configurations of the server 104 and the database 106 pertaining to the embodiment of the present invention. The server 104 includes a CPU 202, which configures a control component that controls and an associating component that associates, a system memory 208 that stores data, a CRT 206, which is a display component that displays data, a frame memory 204, which stores image data displayed on the CRT 206, modem (or TA) 212, which converts data in order for the data to be transmitted to and received from an external device, and a transmitting/receiving circuit 210, which configures a transmitting component and a receiving component that transmit data to and receive data from the modem 212. The database 106 that is connected to the server 104 includes an image database 214, a member registration information database 216, and a billing information/photo-lab service information database 218.

Figure 3:
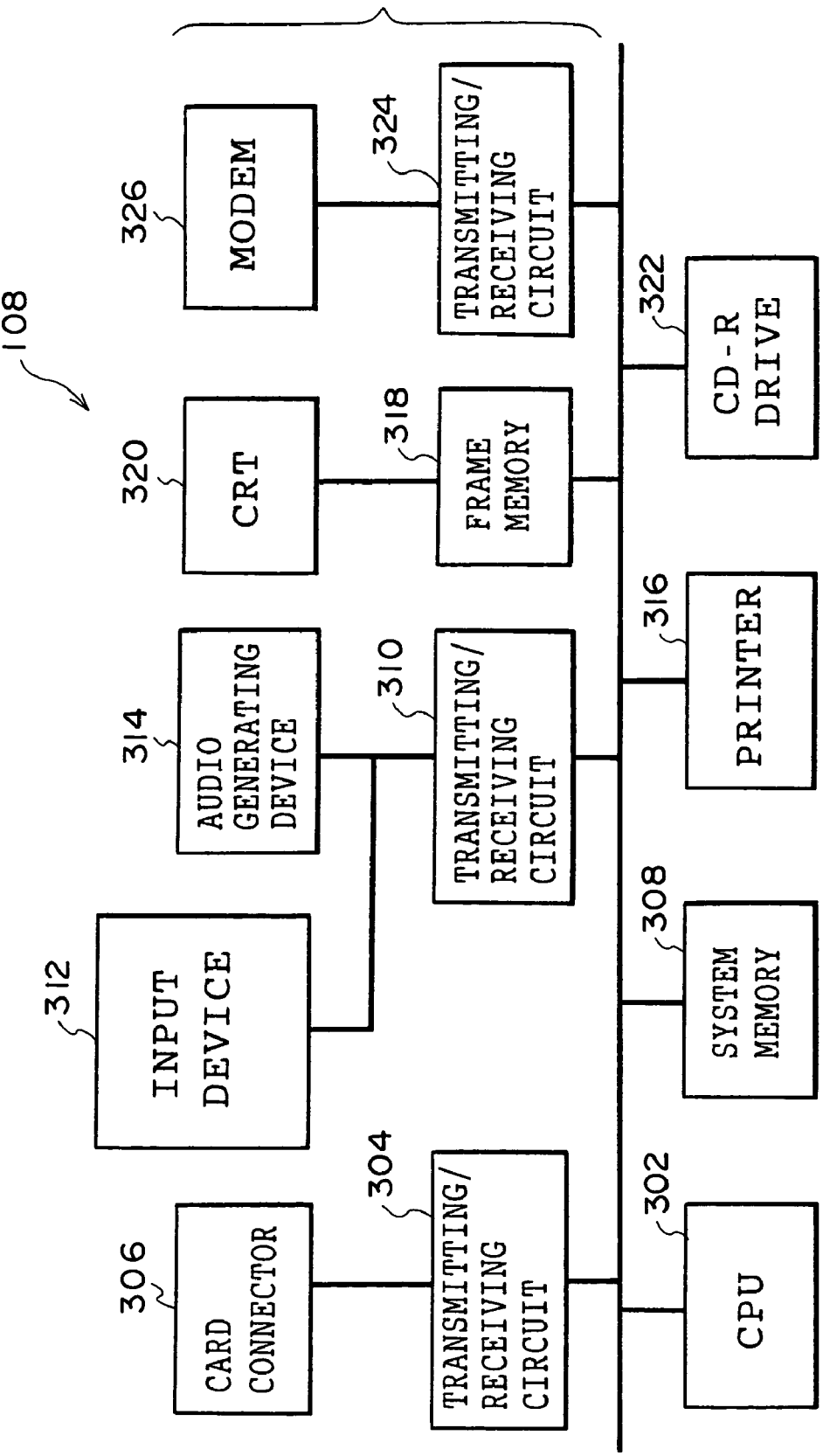
FIG. 3 shows a client in the embodiment of the present invention.

FIG. 3 is a block diagram showing the internal configuration of the clients 108 that are connected via the network 102 to the server 104 pertaining to the embodiment of the present invention. The clients 108 include a CPU 302, which is a control component that controls, a system memory 308, such as a ROM or RAM that stores data, a CRT 320, which is a display component that displays data, a frame memory 318, which stores image data displayed on the CRT 320, a modem (or TA) 326, which converts data in order to communicate with an external device, a transmitting/receiving circuit 324, which configures a transmitting component and a receiving component that transmit data to and receive data from the modem 326, a printer 316 that prints data, a large capacity storage device 322, such as a CD-R drive, which is an external storage device, an input device 312, such as an operation switch, a touch panel, a keyboard, or a mouse, which configures a designating component, an audio generating device 314 that conducts audio annunciation, a transmitting/receiving circuit 310, which transmits data to and receives data from the input device 312 and the audio generating device 314, a card connector 306, with which a memory card can be detachably loaded, and a transmitting/receiving circuit 304, which transmits data to and receives data from the card connector 306.

Figure 4:
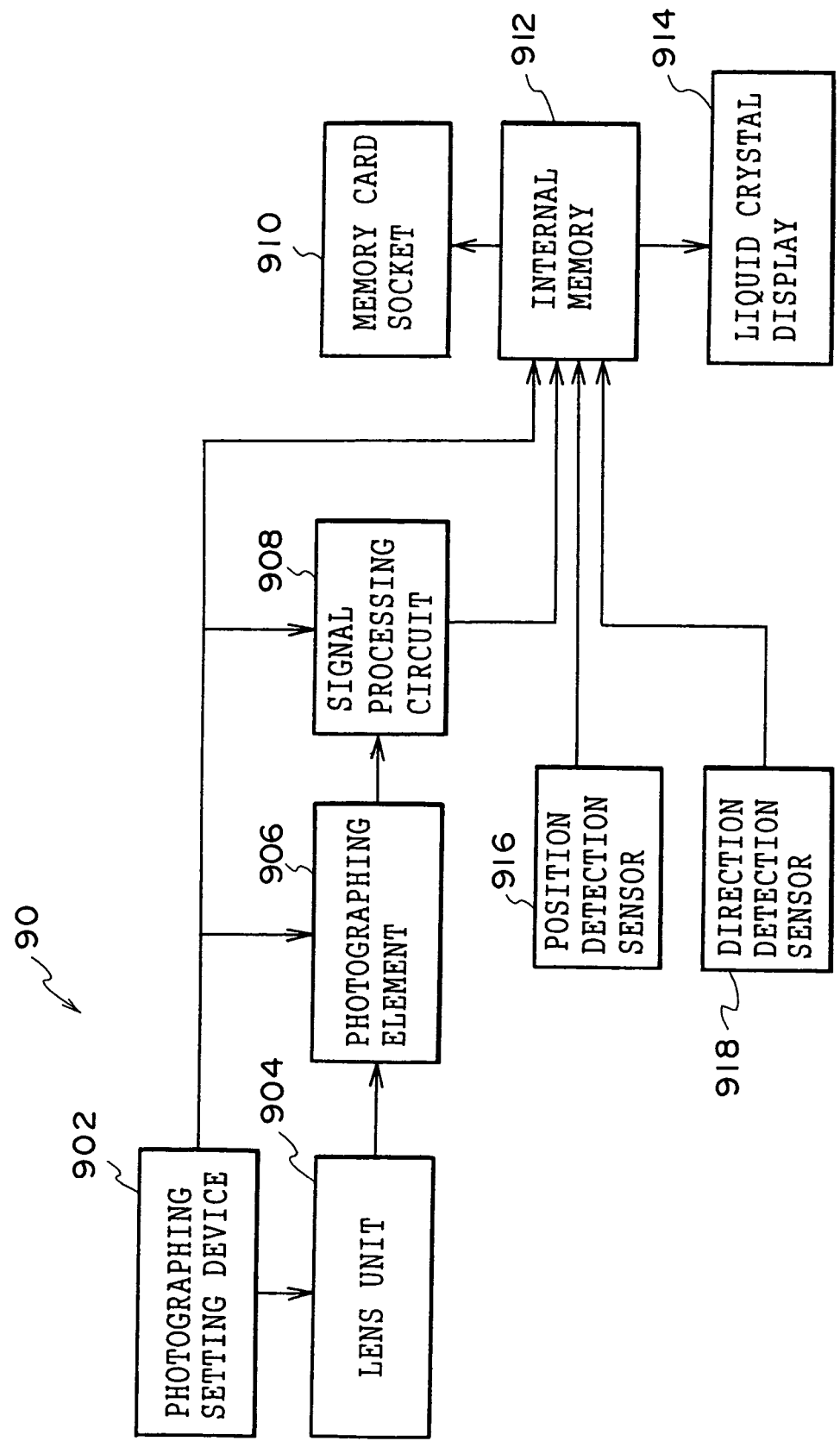
FIG. 4 shows a digital camera in the embodiment of the present invention.

FIG. 4 is a block diagram showing the internal configuration of a digital camera 90 serving as a photographing device pertaining to the embodiment of the present invention. The digital camera 90 includes a lens unit 904 that receives light rays from a subject, a photographing element 906, in which the received light rays are imaged, a signal processing circuit 908, which processes an electrical signal outputted from the photographing element 906, a photographing setting circuit 902, which sets focal distance and f-stop, a position detection sensor 916 including GPS and the like, a direction detection sensor 918, a memory card socket 910, into which a detachable memory card can be loaded, an internal memory 912, which stores image data outputted from the signal processing circuit 908, and a liquid crystal monitor 914, which displays the image data. The lens unit 904 and the photographing element 906 configure a photographing component, the position detection sensor 916 and the direction sensor 918 configure a detection component, and the internal memory 912 configures a storage component.

Next, the action of the present embodiment will be described.

Figure 5:
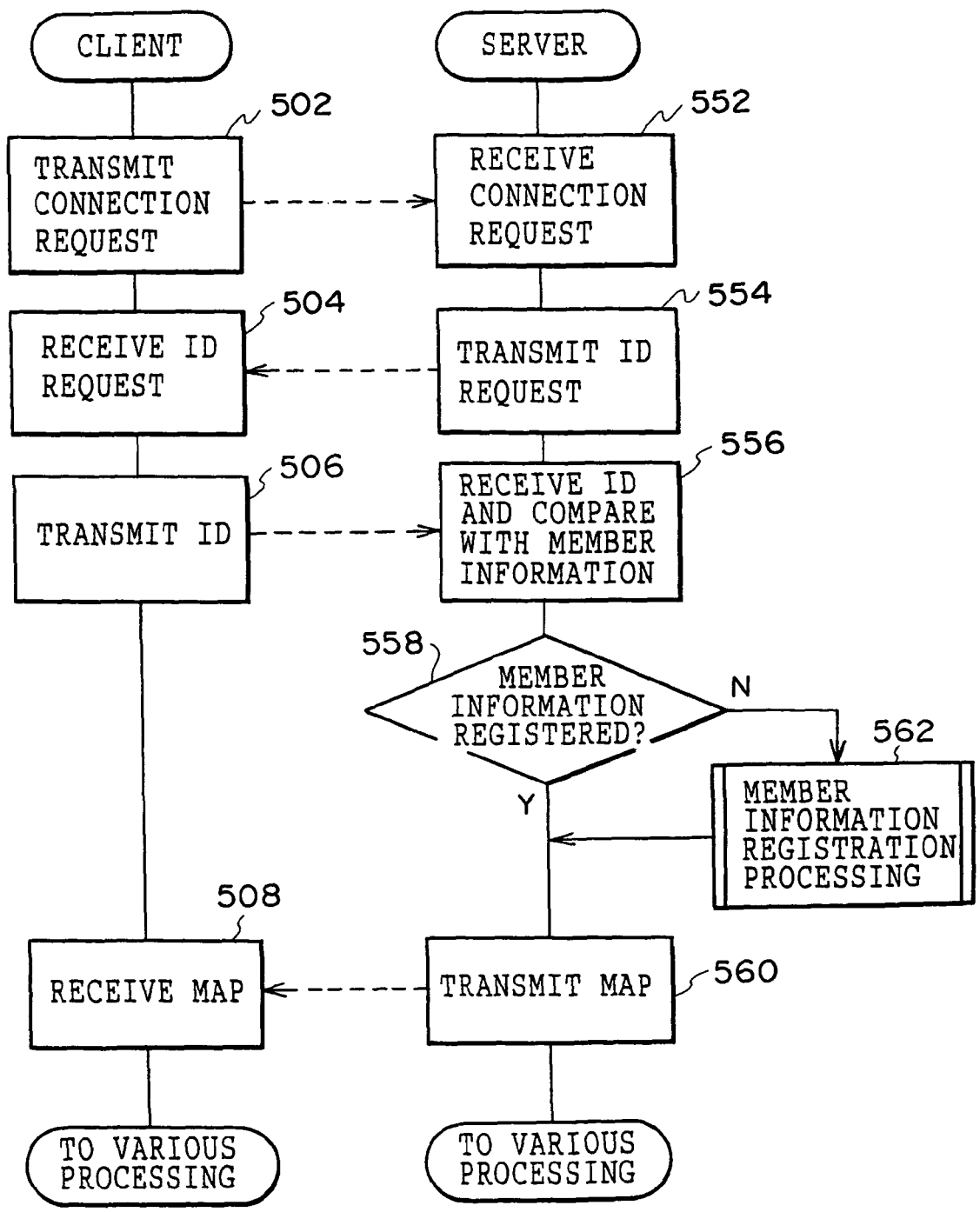
FIG. 5 shows connection request processing in the embodiment of the present invention.

Using FIG. 5, connection request processing when the client 108 is connected to the server 104 will be described. In a case where the client 108 is an individual personal computer, the site address of the server 104 is designated by a browser such as Internet Explorer, whereby a connection request is transmitted from the client 108 to the server 104 in step 502. When the server 104 receives the connection request in step 552, the server 104 transmits an ID request to the client 108 in step 554.

Figure 8:
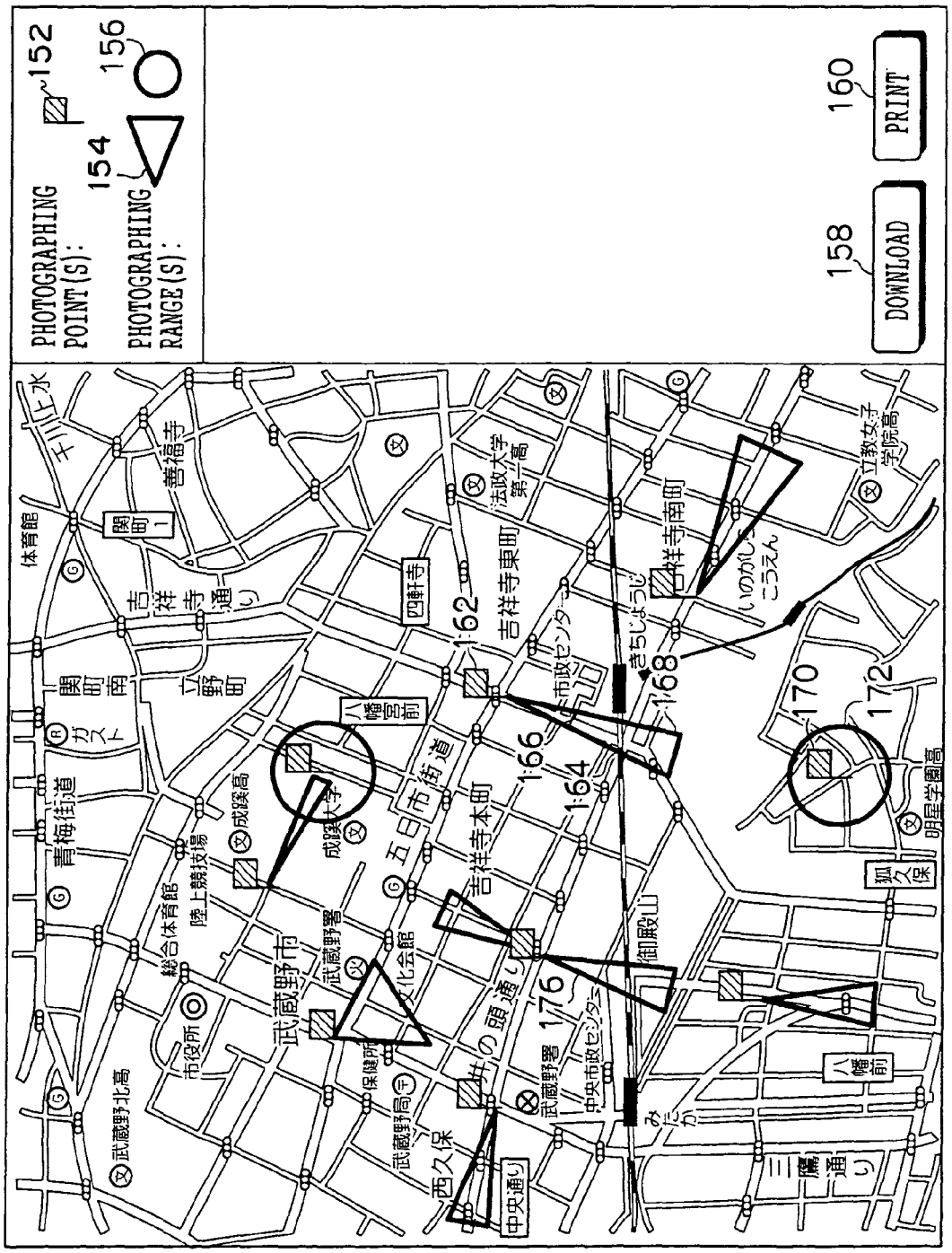
FIG. 8 shows a map in the embodiment of the present invention.

In step 504, when the client 108 receives the ID request, the user of the client 108 is prompted to input an ID by, for example, an ID input screen being displayed on the CRT 320. When the user inputs the ID, the ID is transmitted to the server 104 in step 506. In step 556, when the server 104 receives the ID, the server 104 compares the received ID with IDs of registered member information. In step 558, in a case where it is determined that the IDs match, because it is determined that the current user is the registered user, a map such as the one shown in FIG. 8 is transmitted to the client 108 in step 560.

Figure 6:
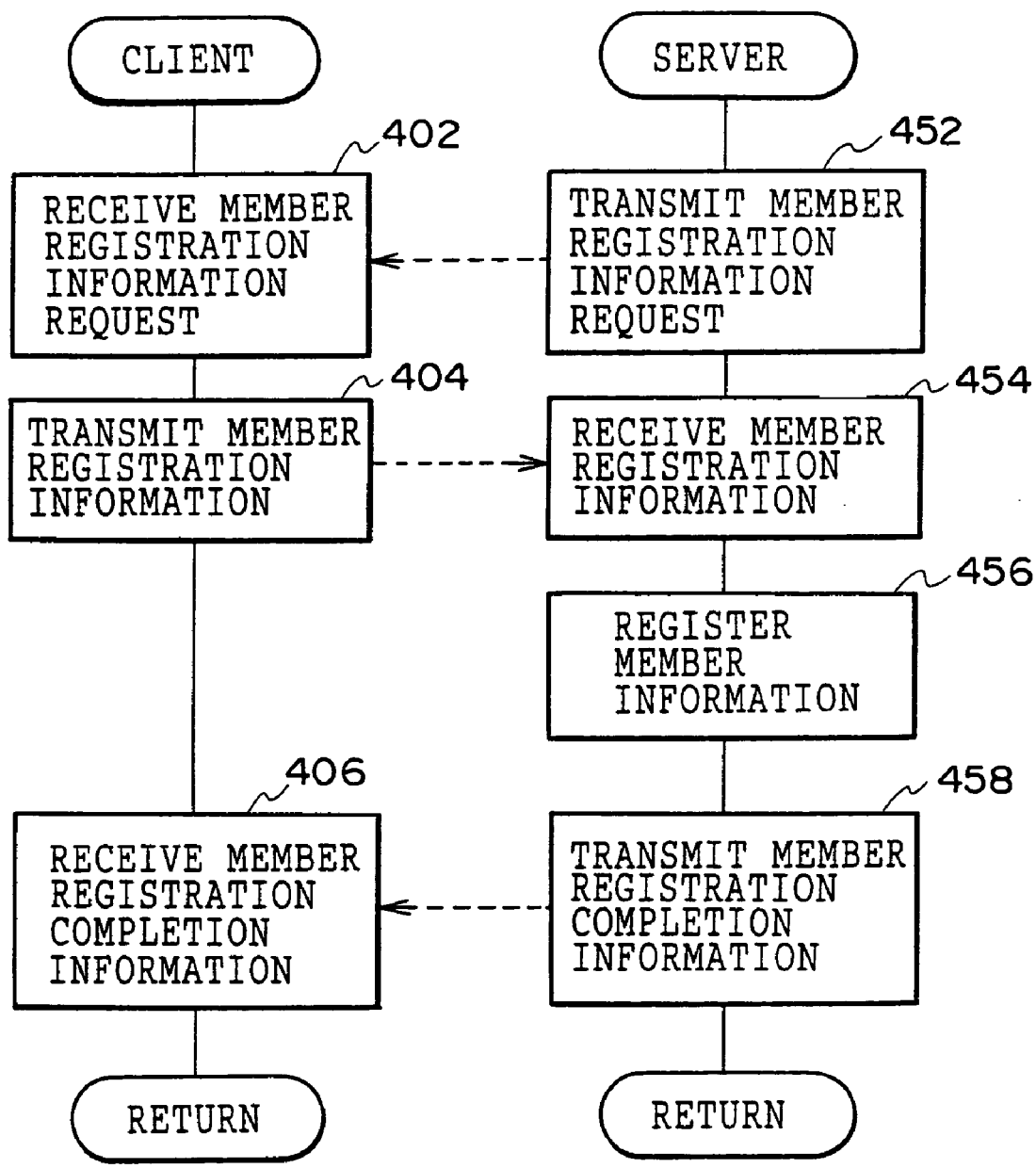
FIG. 6 shows member information registration processing in the embodiment of the present invention.

In step 508, the client 108 receives the map and displays the map on the CRT 320. Any map may be displayed at any magnification by selection of the user. Thereafter, the server 104 and the client 108 shift to various processing such as downloading processing, request processing, and uploading processing. Alternatively, when it is determined in step 558 that the user is not a registered member, processing shifts to step 562, i.e., to member information registration processing shown in FIG. 6.

In the member information registration processing, the server 104 transmits a member registration information request to the client 108 in step 452. When the client 108 receives the member registration information request in step 402, a member registration information input screen is displayed on the CRT 320 and the user is prompted of a request for member registration information. When the user inputs the member registration information, the client 108 transmits the member registration information to the server 104 in step 404.

When the server 104 receives the member registration information in step 454, the member information is registered in the member registration information database 216 in step 458. In step 458, the server 104 transmits member registration completion information to the client 108, and when the client 108 receives the member registration completion information in step 406, the member registration information processing is concluded, and the processing proceeds to step 560 of the connection request processing of FIG. 5.

A flag mark 152 that represents a photographing point of an image, and a triangular mark 154 and a circular mark 156 representing a photographing range, are displayed in the map of FIG. 8 that is transmitted in step 560 and received in step 508. These marks are associated with images accumulated in the image database 214. The angle of the vertex at which the flag of the triangular mark is positioned represents an angle of view when an image is photographed, and the height of the triangle of which this angle is the vertex represents a distance to a subject in focus. The circular mark represents that a flag within the circle is the photographing point and that images photographed in the entire range are accumulated in the image database 214. It should be noted that the flag mark 152, the triangular mark 154, and the circular mark 156 configure information representing a photographing direction from the photographing point to the subject of the present invention.

For example, a triangle 164 represents that images photographed at the point of a flag 162, at an angle of view represent by an angle of view 166, and with a subject of a point 168 being focused are accumulated in the image database 214. A circle 172 represents that images photographed in all directions at the point of a flag 170 are accumulated in the image database 214.

Figure 7:
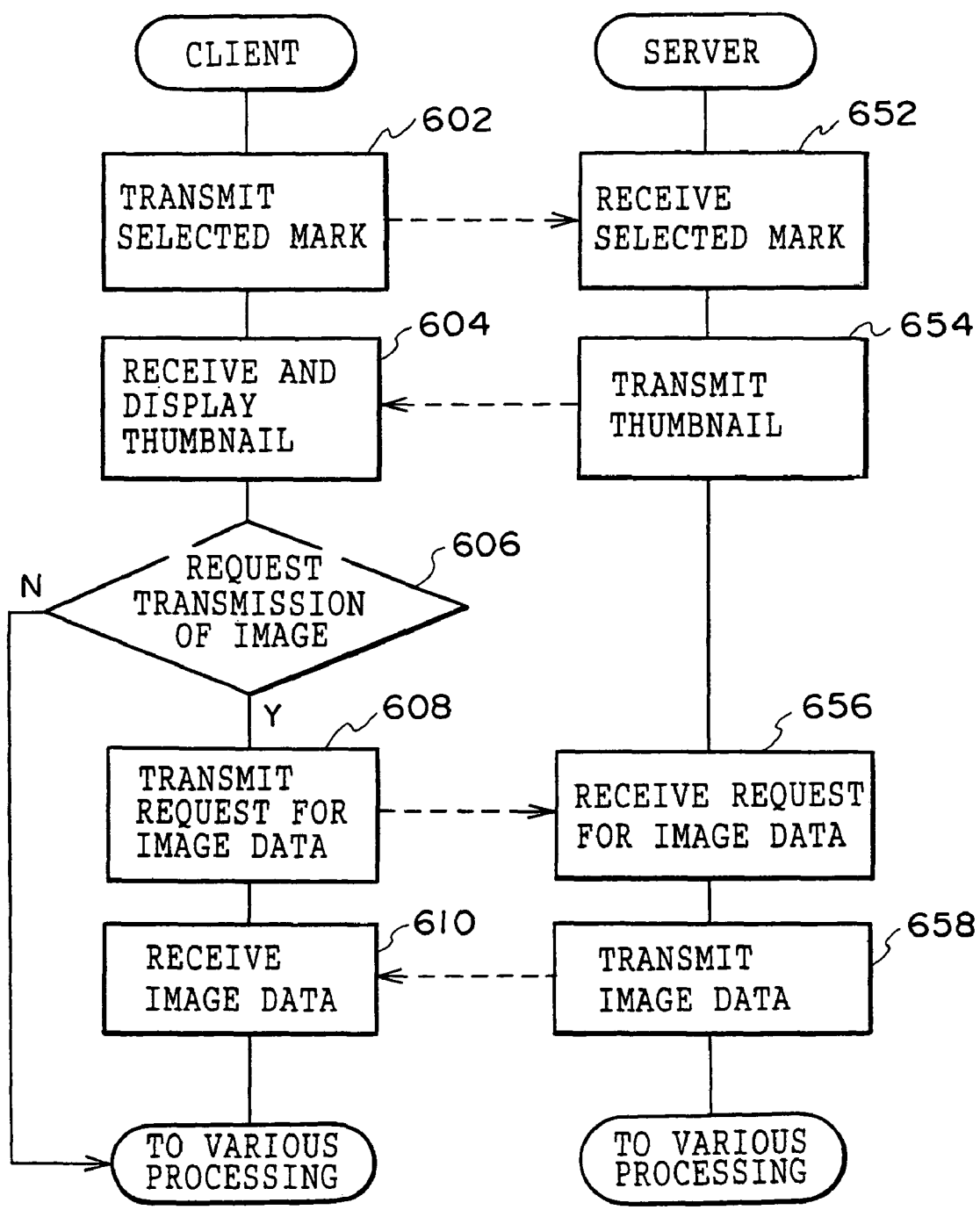
FIG. 7 shows downloading processing in the embodiment of the present invention.

Next, using FIG. 7, downloading processing, in which the client 108 downloads images from the image database 214 via the server 104, will be described. When a mark (e.g., a triangle 176) representing a desired image is clicked by a user with a mouse pointer 174 shown in the map of FIG. 9, the client 108 transmits the selected mark to the server 104 in step 602. When the server 104 receives the mark in step 652, the server 104 transmits a thumbnail of the image associated with the mark to the client 108 in step 654.

Figure 9:
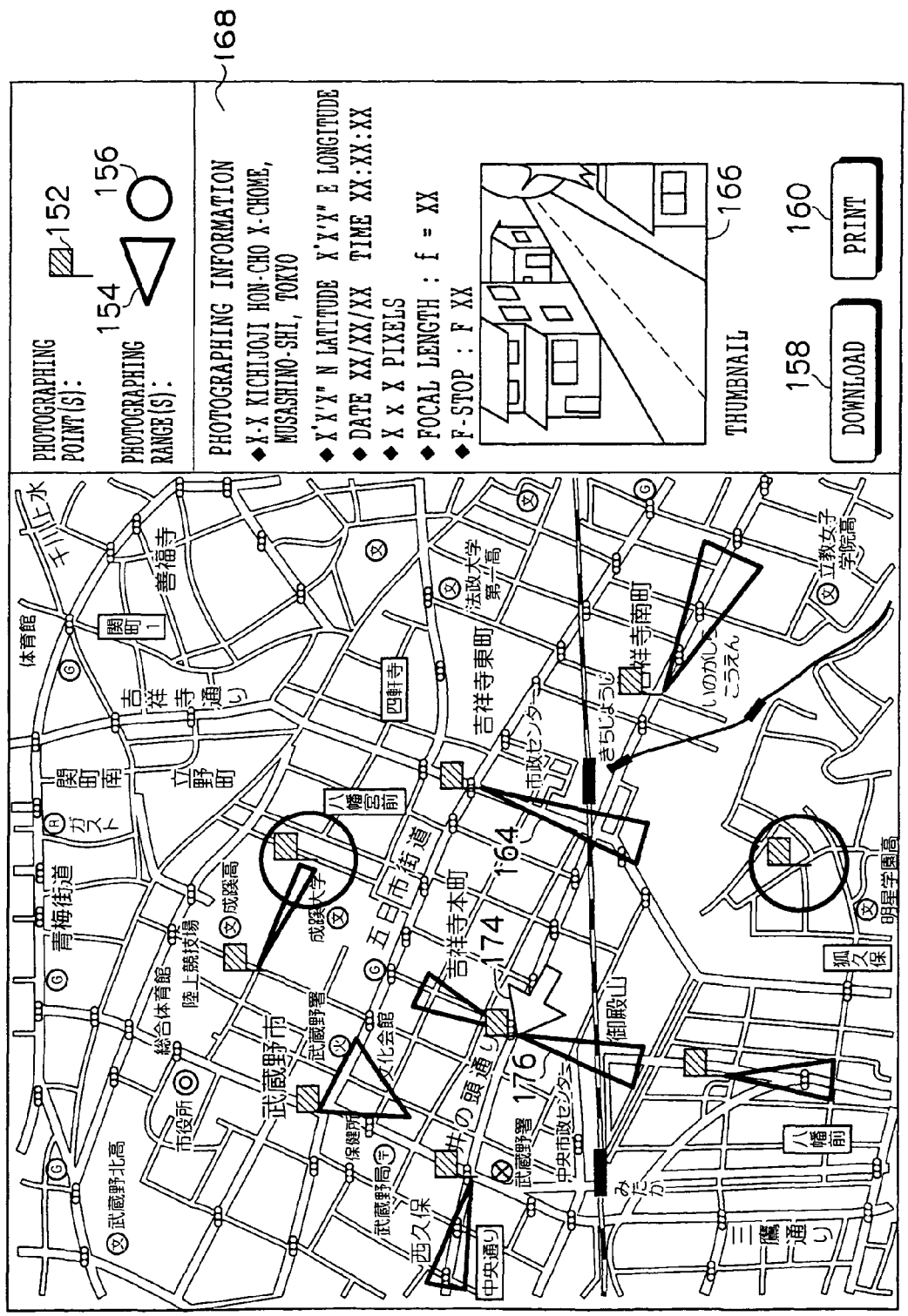
FIG. 9 shows a map and a thumbnail in the embodiment of the present invention.

In step 604, when the thumbnail is received, a thumbnail 166 is displayed simultaneously with a map screen, as shown at the right side of FIG. 9. At this time, photographing information 168, such as the address, latitude, longitude, photographing date and time, photographing pixel number, focal distance, f-stop, etc. at the photographing point may also be displayed together with the thumbnail 166. In a case where the user wishes to download the image by verifying the displayed thumbnail 166, the user can select a download button 158. In step 606, in a case where it is determined that the download button 158 has been selected and an image transmission request has been made, the client 108 transmits an image data request to the server 104 in step 608.

When the server 104 receives the image data request in step 656, the server 104 transmits the image data to the client 108 in step 658, and the client 108 receives the image data in step 610. Thereafter, the server 104 and the client 108 shift to various processing such as downloading processing, request processing, and uploading processing.

The image data can be transmitted online, from the modem 212 via the transmitting/receiving circuit 210 of the server

104, to the transmitting/receiving circuit 324 via the modem 326 of the client 108. Also, when the user desires a printed image, the server 104 can transmit the image data to the terminal 110 in a photo-lab and the like, as shown in FIG. 1. In the photo-lab, the printed image may be sent to a DEP nearest the user and the user may be prompted of receipt, or the printed image may be sent to the user's residence by a parcel delivery service.

Figure 10:
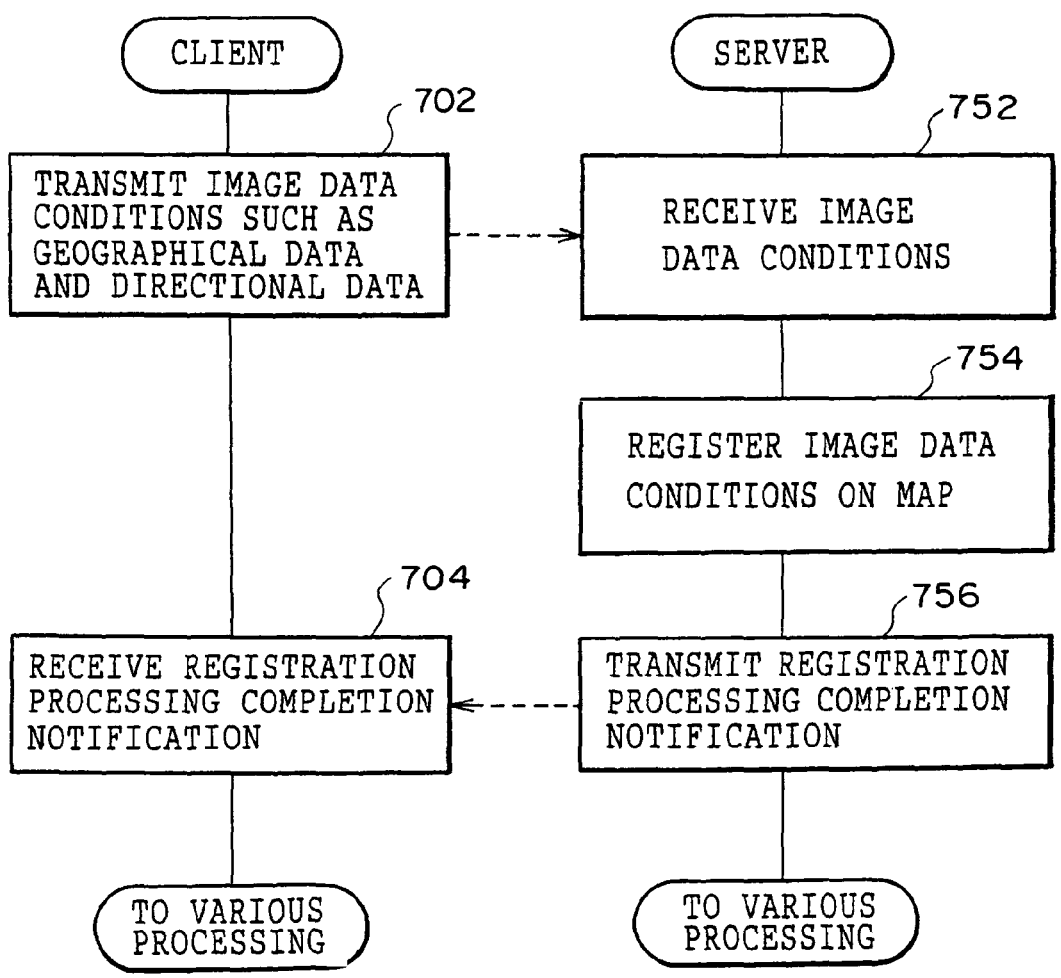
FIG. 10 shows request processing in the embodiment of the present invention.

Next, request processing will be described using FIG. 10. The user can select this processing when there is no mark representing an image that the user desires in the designated map. The user inputs image data conditions, such as geographical data and directional data of the desired image, via the input device 312 of the client 108. In step 702, the client 108 transmits these image data conditions to the server 104. When the server 104 receives these image data conditions in step 752, the server 104 converts these image data conditions to a flag mark and a triangular mark or a circular mark and registers the same on the map in step 754.

The image data conditions can be inputted as character information via the input device 312 such as a keyboard. The address, latitude, longitude, photographing date and time, photographing pixel number, focal distance, f-stop, etc. at the photographing point may be included in the image data conditions. The height and angle of view of the triangular mark are calculated in the CPU 202 on the basis of the latitude, longitude, focal distance, f-stop, etc. of this data. The user may also use a mouse or the like to point to the distance from the photographing point on the map displayed on the CRT 320 to the subject in focus and drag the angle of view. In this case, the triangular mark is disposed on the map on the basis of these coordinate data.

Figure 11:
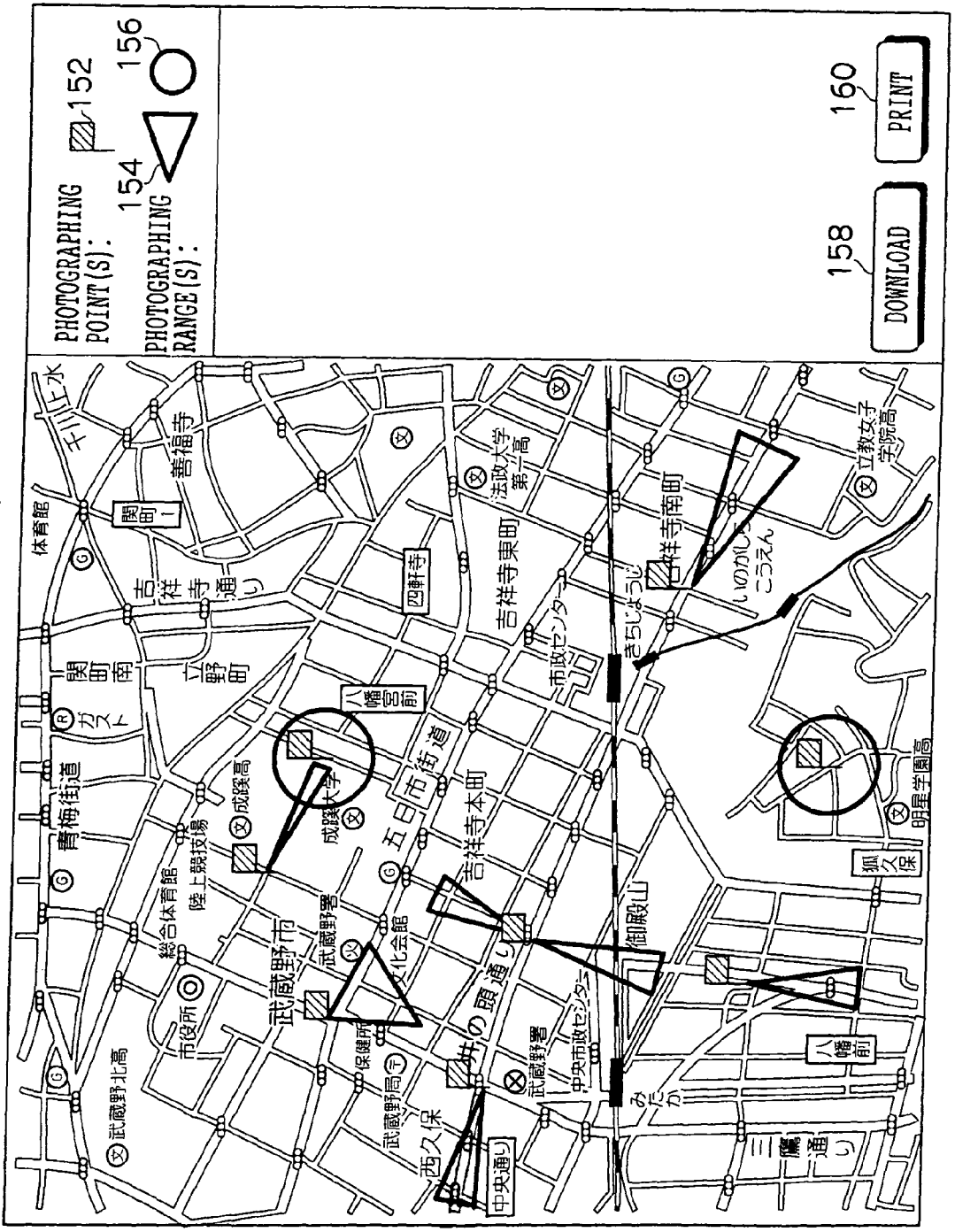
FIG. 11 shows a map in the embodiment of the present invention.
Figure 12:
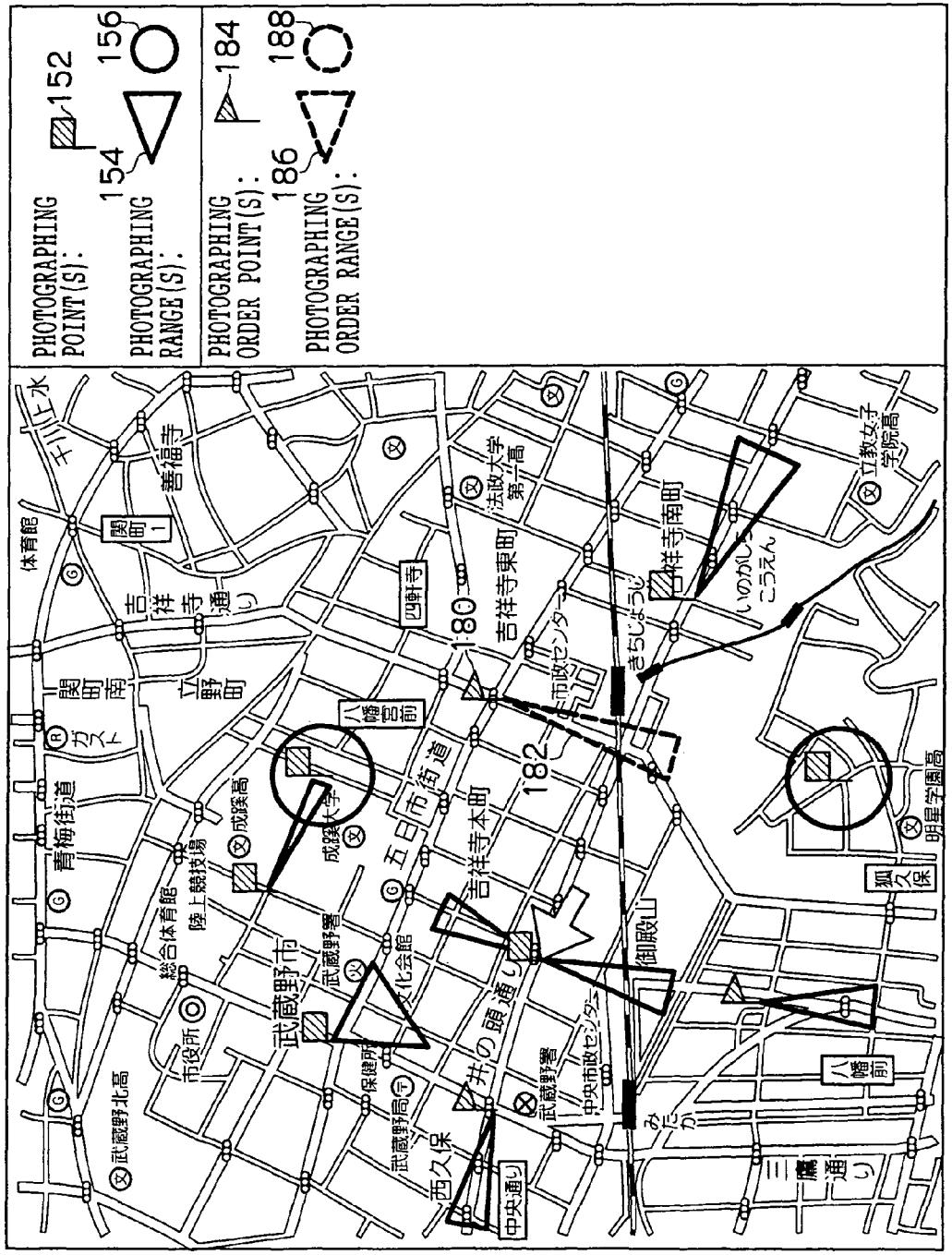
FIG. 12 shows a map in the embodiment of the present invention.

Specifically, a flag mark 184, a triangular mark 186, and a circular mark 188, such as the ones shown in FIG. 12, are created by the user inputting the geographical data and the directional data via the input device 312. Thus, in a case where the map shown in FIG. 11 is displayed, a flag mark 180 and a triangular mark 182 shown in FIG. 12 are created and displayed on the map by the user inputting the geographical data and the directional data via the input device 312. Thus, the fact that the image including the focus point and the angle of view of the triangular mark 182 photographed at the point of the flag mark 180 is desired is indicated.

Similar to the marks associated with images already accumulated in the image database 214, these marks are created so as to represent the photographing point, angle of view, focal distance, etc. However, these can be distinguished by changing the display mode, such as the shape of the flag, line type, and color. In the present embodiment, they are distinguished from the marks representing accumulated images by changing the shape of the flag from quadrangular to triangular and changing the lines of the triangular marks and circular marks from solid lines to broken lines.

Figure 13:
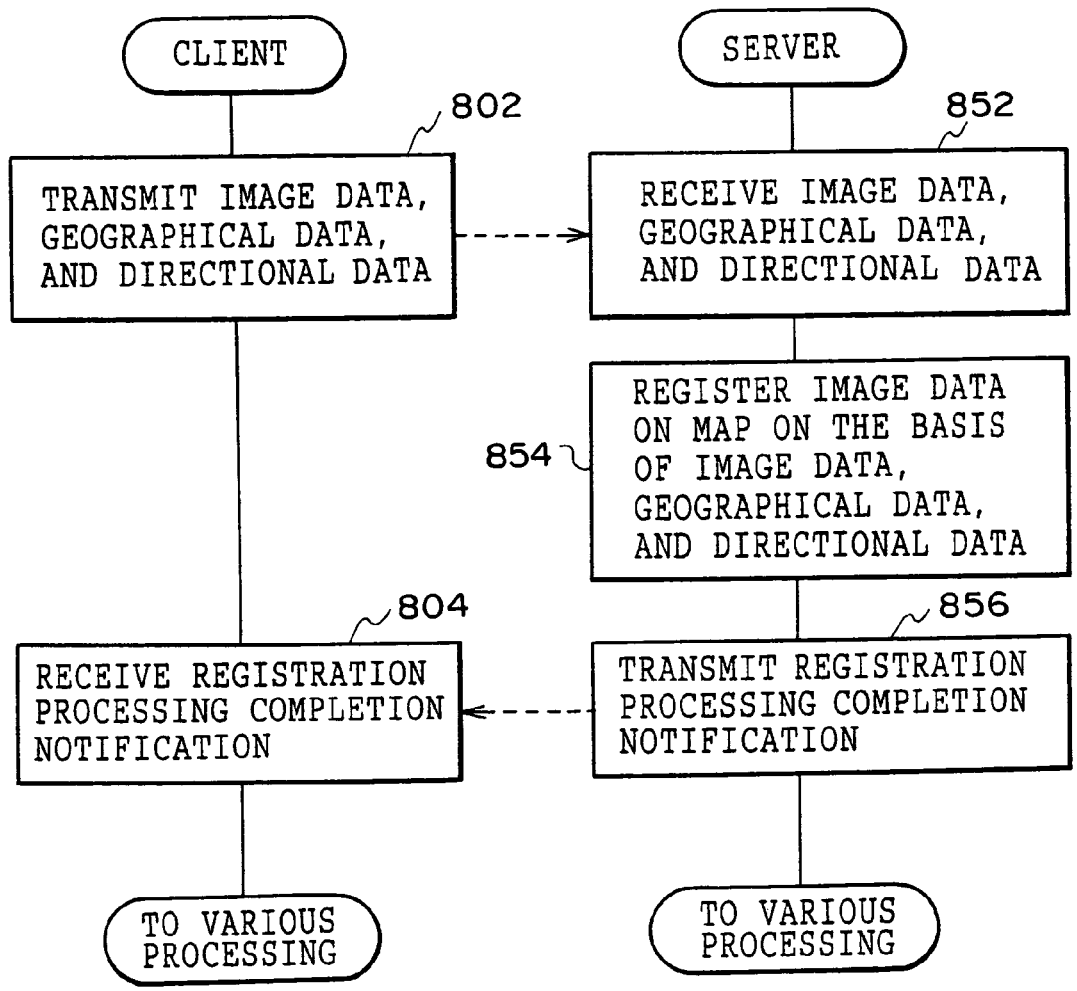
FIG. 13 shows uploading processing in the embodiment of the present invention.

Next, uploading processing will be described using FIG. 13. The user can select this processing when uploading of an image is desired. Uploading may be conducted in correspondence to a mark representing a requested image. The user inputs, via the input device 312, directional data and geographical data together with the image data to be uploaded. In step 802, the client 108 transmits the inputted image data, geographical data, and directional data to the server 104.

The geographical data and directional data can be inputted as character information via the input device 312 such as a keyboard. For example, the address, latitude and longitude of the photographing point may be inputted as the geographical data and the directional data. Moreover, the photographing date and time, photographing pixel number, focal distance, and f-stop may be inputted as the image data conditions. The height and angle of view of the triangular mark are calculated in the CPU 202 on the basis of the geographical data and directional data. The user may also use a mouse or the like to click the distance from the photographing point on the map displayed on the CRT 320 to the subject in focus and drag the angle of view. In a case where the requested image is to be uploaded, a mark representing the request may simply be clicked with a mouse pointer.

When the server 104 receives the data in step 852, the image data is accumulated in the image database 214 in step 854. The CPU 202 associates the image data with the accumulated image data and displays, on the map, the flag mark representing the photographing point and the triangular mark representing the angle of view and direction of the photographing. In this case, because the marks are associated with the images in the image database 214, a flag mark 190 is shown with a quadrangle and a triangular mark 192 is shown with solid lines, as shown in FIG. 14.

Uploading processing is concluded when the server 104 transmits a registration processing completion notification to the client 108 in step 856 and the client 108 receives the registration processing completion notification in step 804.

When an image to be uploaded is photographed, the digital camera 90 shown in FIG. 4 can be used. The digital camera 90 includes the position detection sensor 916, such as GPS, and the direction detection sensor 918. When an image is photographed with this digital camera, the geographical data at the time of photographing detected by the position detection sensor 916, the directional data detected by the direction detection sensor 918, and the focal distance and f-stop set by the photographing setting circuit 902 and the like are transmitted to the internal memory 912 and stored together with the images. The image data may be recorded in an Exif-format file in order to include the data.

The file is stored in a memory card via the memory card socket 910. The memory card is loaded into the card connector 306 of the client 108 and, in step 802, the file is transmitted by the client 108, whereby the image data and the image data conditions are received by the server 104 in step 852.

As described above, a map including the photographing point of a subject is displayed, information representing the photographing direction from the photographing point to the subject is displayed at a position on the map corresponding to the photographing point. That is, a flag mark, a triangular mark, and a circular mark are displayed, and information representing the photographing direction from the photographing point to the subject is displayed at a position on the map corresponding to the photographing point, to thereby allow the user to view the same. Thus, the user can easily know the photographing state of the image data.

By varying the display mode of the information representing the photographing direction between a case where the subject is photographed and a case where the subject is not photographed (i.e., by changing the shape of the flag mark and the line types of the triangular mark and the circular mark), the user can intuitively know whether or not desired image data is present. When it is determined that the image data is photographed on the basis of the display mode of the information, the image data can be downloaded by the information, and when it is determined that the image data is not photographed, the image data can be uploaded by the information.

The client 108 can download images from the image database 214 connected to the server 104 on the basis of the marks on the map presented by the server 104. The user can intuitively know the photographing state of the image data accumulated in the image database 214 from the flag mark, the triangular mark, and the circular mark, whereby the user can effectively download the image data.

When a mark representing image data that the user desires is not displayed on the map, the client 108 requests the desired image data from the server 104, and the server 104 generates a mark on the basis of the image data conditions of the image data and displays the mark on the map. Another user can intuitively imagine the image data not accumulated in the image database 214 from the flag mark, the triangular mark, and the circular mark displayed in a display mode that is different from the case where the image data is accumulated in the database 214, whereby the other user can effectively upload the desired image data.

In a case where image data is to be uploaded, when the geographical data and directional data of the image data to be uploaded is transmitted together with the image data, the server 104 accumulates the image data in the image database 214, associates the image data with image data, and displays a mark representing the fact that the image data is accumulated in the image database 214. Thus, the user knows that an image has been uploaded, and can also intuitively know the photographing state of the newly uploaded image data.

Although the geographical data and the directional data may be transmitted as character data via a keyboard, they may also be transmitted by clicking a mark on the map with a mouse. Thus, time for input by the user can be reduced.

Moreover, by photographing with the digital camera 90 including the position detection sensor 916 and the direction detection sensor 918, image data is generated, and the geographical data the directional data detected by the position detection sensor 916 and the direction detection sensor 918 can be stored in an Exif-format file together with the corresponding image data. By transmitting this file, time for input by a user is reduced without the need for the user to transmit the geographical data and the directional data separately from transmitting the image data.

The image and the photographing point of the subject of the image are corresponded and stored in the image database 214, a map in which a mark representing the photographing direction from the photographing point to the subject is displayed at a position on the map corresponding to the photographing point is presented to the user, the mark is selected, and image data made to correspond to the photographing point represented by the mark is searched. Thus, the user can effectively search the image data by intuitively knowing the photographing state of the image data from the mark shown on the map.

By displaying, on a map, marks by which the user can intuitively know the presence or absence of image data in the database 214, the content of the image data, and the presence of a desired image, the user can effectively download image data by intuitively knowing the photographing state of the image data, and can also upload desired image data. Thus, construction of the image database 214 is facilitated, and accumulated image data can be easily increased.

Although no description was given in the above-described embodiment of billing at the time of member registration, image downloading processing, request processing and uploading processing, the present invention is not limited to the same and may be configured to bill. For example, the present invention may be configured so that, at the time of member registration, billable information such as a credit card is registered in the member registration information database 216 and billed in the billing information/photo-lab service information database 218 when the user has conducted processing for which billing is necessary, and the user is billed, for example, per month. Similarly, with respect to a user that has conducted uploading, part of the profit arising when an uploaded image has been downloaded may be paid.

For example, a user conducting uploading may set a price as image information together with the image, and the price may be billed to a user conducting downloading Prices may be set, between a user uploading image data and a user downloading image data, by transmitting and receiving e-mail or by an auction format. In this case, money may be received directly between the users. However, in order to ensure reliability, it is preferable for money to be received through a registered credit card. When a user does not wish to use a credit card over the network, it is preferable to pay using a bank transfer, a postal transfer, or a convenience store transfer via the server.

Although triangular or quadrangular flag marks and solid-line or broken-line triangular marks were used in the present embodiment as the information that represents the photographing direction from the photographing point to the subject and is displayed at the position on the map corresponding to the photographing point, the present invention is not limited to the same. Marks of any shapes and display modes can be used to represent the photographing direction from the photographing point to the subject. Also, marks in which other information is represented, such as photographing altitude and the like, may also be used together with the information representing the photographing direction from the photographing point to the subject.

The maps shown in FIGS. 8, 9, 11, 12 and 14 are Japanese maps, and place names are shown on the maps in Japanese. However, the present invention is not limited to the same. Maps of any countries may be used, and place names and the like may be shown in any languages. The language used may also be changed upon a request therefor from the user.

It should be noted that the network shown in FIG. 1 is not limited to the Internet, and that LAN, WAN, Intranet, and a dedicated line may also be used. Downloading, uploading, and requesting of image data is not limited to being conducted by the client 108 via the Internet 102, and may also be conducted by the server 104 by displaying a map on the CRT 204 of the server 104.

What is claimed is:

1. A display device, comprising:
    a display component; and
    a control component that controls the display component so that a map including a photographing point of subjects is displayed, such that information representing photographing directions from the photographing point to the subjects and information representing the photographing point are graphically displayed at a position on the map corresponding to the photographing point, and when information representing a photographing direction that has been displayed on the map is selected and designated, an image corresponding to the selected and designated information is displayed,
    wherein, when image data of subjects that are desired by a user is not stored, the control component controls the display component such that information representing multiple photographing directions to the subjects that the user desires from a photographing point the user desires and information representing the photographing point are graphically displayed at a position on the map corresponding to the photographing point the user desires,
    wherein the photographing directions that the user desires and the photographing point the user desires are input by the user, and wherein the control component varies a display mode of the information representing the photographing directions and the information representing the photographing point between when image data of the subjects are stored and when the image data of the subject that the user desires have not been stored, wherein the display mode is varied by changing at least one of the shape, line type, and color of the graphic displayed, such that each display mode is visually distinguished from each other.

2. An image information management terminal, comprising:
- a display component;
- a receiving component that receives a map including a photographing point of subjects and information representing photographing directions from the photographing point to the subjects and information representing the photographing point; and
- a control component that controls the display component so that the map is displayed, such that the information representing the photographing directions is graphically, displayed at a position on the map corresponding to the photographing point, on a basis of the map and the information representing the photographing directions received by the receiving component, and when information representing a photographing direction that has been displayed on the map is selected and designated, an image corresponding to the selected and designated information is displayed,
- wherein, when image data of subjects that are desired by a user is not stored, the control component controls the display component such that information representing multiple photographing directions to the subjects that the user desires from a photographing point the user desires and the information representing the photographing point are graphically displayed at a position on the map corresponding to the photographing point the user desires, said information representing said photographing direction comprising a plurality of pieces of information respectively representing photographing directions,
- wherein the control component varies a display mode of the information representing the photographing directions and the information representing the photographing point between when image data of subjects are stored and when the image data of the subjects that the user desires have not been stored, wherein the display mode is varied by changing at least one of the shape, line type, and color of the graphic displayed, such that each display mode is visually distinguished from each other, and
- wherein the image information management terminal further comprises an input component for inputting information representing the photographing point that the user desires and photographing directions to the subjects that the user desires.

3. The image information management terminal of claim 2, further comprising a transmitting component for transmitting a request to transmit image data of the subject, wherein
- the receiving component is configured so as to be able to receive the image data,
- the receiving component receives the image data transmitted in accordance with the transmission request by the transmitting component, and
- the control component controls the display component so that an image of the image data received by the receiving component is displayed.

4. The image information management terminal of claim 2, further comprising a transmitting component for transmitting image data obtained by photographing the subjects and data of the photographing point of the subjects.

5. The image information management terminal of claim 2, further comprising a transmitting component for transmitting information representing the photographing point and directions from the photographing point to the subjects.

6. The image information management terminal of claim 5, further comprising a designating component for designating, on the map displayed by the display component, information representing the photographing directions from the photographing point to the subjects, wherein the transmitting component transmits the information representing the photographing directions from the photographing point to the subjects when the information is designated by the designating component.

7. An image information management system, comprising:
- an image information management device that includes a transmitting component for transmitting a map that includes a photographing point of a subject and information representing a photographing direction to the subject from the photographing point; and
- an image information management terminal of claim 2.

8. The image information management system of claim 7, wherein the image information managing device further comprises a receiving component for receiving a request to transmit image data of the subject,
- wherein the transmitting component of the image information managing device transmits the image data, and
- wherein the transmitting component of the image information management device transmits the image data to the image information management terminal when the transmission request is received by the receiving component of the image information managing device.

9. The image information management system of claim 7, wherein the image information management device further comprises:
- a receiving component for receiving image data obtained by photographing the subjects and data of the photographing point of the subjects from the image information managing terminal; and
- an associating component for associating the image data received by the receiving component with the photographing point on the map on a basis of the data of the photographing point received by the receiving component 10. The image information management system of claim 7, wherein the image information managing device further comprises:
- a receiving component for receiving the information representing the photographing point and the information representing the photographing directions from the photographing point to the subjects from the image information management terminal; and
- an associating component for associating the photographing point on the map with the information when the information representing the photographing point and the information representing the photographing directions from the photographing point to the subjects has been received by the receiving component.

11. An image display method, comprising:
- corresponding and storing image data obtained by photographing subjects and a photographing point of the subjects in a storage component by a control component;
- displaying a map including the photographing point of the subjects on a display component, and graphically displaying, at a position on the map corresponding to the photographing point, information representing photographing directions from the photographing point to the subjects and information representing the photographing point, said information representing said photographing directions comprising a plurality of pieces of information respectively representing the photographing directions;

when the information representing a photographing direction from the photographing point to the subjects is selected and designated on the map, displaying the image data corresponding to the photographing point based on the selected and designated information; and when image data of subjects that a user desires has not been stored, graphically displaying information representing multiple photographing directions to a subject that the user desires from a photographing point that the user desires and the information representing the photographing point at a position on the map corresponding to the photographing point the user desires, wherein the photographing point that the user desires and the photographing direction to the subject that the user desires are input by the user, and wherein the control component varies a display mode of the information representing the photographing directions and the information representing the photographing point between when image data of the subjects are stored and when the image data of the subjects that the user desires have not been stored, wherein the display mode is varied by changing at least one of the shape, line type, and color of the graphic displayed, such that each display mode is visually distinguished from each other.

* * * * *